(12) United States Patent
Carmel et al.

(10) Patent No.: US 7,693,940 B2
(45) Date of Patent: Apr. 6, 2010

(54) METHOD AND SYSTEM FOR CONVERSATION DETECTION IN EMAIL SYSTEMS

(75) Inventors: David Carmel, Haifa (IL); Shai Erera, Kiryat Ata (IL)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 11/876,824

(22) Filed: Oct. 23, 2007

(65) Prior Publication Data

US 2009/0106375 A1    Apr. 23, 2009

(51) Int. Cl.
*G06F 15/16* (2006.01)
(52) U.S. Cl. ............... 709/203; 709/205; 709/206; 709/217; 709/223; 709/224
(58) Field of Classification Search ......... 709/203, 709/205, 206, 217, 223, 224
See application file for complete search history.

(56) References Cited

U.S. PATENT DOCUMENTS

| | | | |
|---|---|---|---|
| 5,905,863 A | 5/1999 | Knowles et al. | |
| 7,469,280 B2 * | 12/2008 | Simpson | 709/223 |
| 2002/0188688 A1 * | 12/2002 | Bice et al. | 709/206 |
| 2005/0004990 A1 | 1/2005 | Durazo et al. | |
| 2005/0223061 A1 * | 10/2005 | Auerbach et al. | 709/206 |
| 2006/0085502 A1 * | 4/2006 | Sundararajan et al. | 709/204 |
| 2007/0005716 A1 | 1/2007 | LeVasseur et al. | |
| 2007/0011619 A1 | 1/2007 | Chang et al. | |
| 2007/0038707 A1 | 2/2007 | Broder et al. | |

FOREIGN PATENT DOCUMENTS

WO    WO2007029116 A2    3/2007

OTHER PUBLICATIONS

De Beer et al. Thread and Topic Detection in Text Message Streams , Sep. 29, 2006 Source: http://www.esat.kuleuven.ac.be/sista/mai/2006-2007/ICRI/Thread.htm.
G. Carneni et al., "Summarizing Email Conversations with Clue Words", 2007 Source: http://www2007.org/papers/paper631.pdf.
J. Yates et al., "Conversational Coherence: Using Email Threads to Coordinate Distributed Work" , Nov. 27, 2006 Source: http://seeit.mit.edu/Publications/ThreadingCoherence_27Nov06Working%20Paper.pdf.

(Continued)

*Primary Examiner*—Jinsong Hu

(57) ABSTRACT

A method and system are provided for conversation detection in email systems. Multiple email messages are provided and grouped as relating to a conversation. The grouping is carried out by applying a similarity function based on a similarity of the email messages' attributes, the similarity function including a similarity between the email messages' participants and at least one of a similarity between the email messages' subjects or a similarity between the email messages' contents. The similarity function may also include the similarity between the email messages' dates. The similarity function may also include weightings for the contributions of the email messages' attributes. A graphical user interface is provided in an email client which includes means for viewing email messages by conversation.

18 Claims, 7 Drawing Sheets

OTHER PUBLICATIONS

Thread and Topic Detection in Text Message Streams Source: http://www.esat.kuleuven.ac.be/sista/mai/2006-2007/ICRI/Thread.htm.

G. Carneni et al., "Summarizing Email Conversations with Clue Words" Source: http://www2007.org/papers/paper631.pdf.

J. Yates et al., "Conversational Coherence: Using Email Threads to Coordinate Distributed Work" Source: http://seeit.mit.edu/Publications/ThreadingCoherence_27Nov06Working%20Paper.pdf.

* cited by examiner

METHOD AND SYSTEM FOR CONVERSATION DETECTION IN EMAIL SYSTEMS

FIELD OF THE INVENTION

This invention relates to the field of conversation detection in email systems.

BACKGROUND OF THE INVENTION

Email messages are a very common method for discussion among a group of people. Usually, one person composes a message and sends it to a number of other people. One or more recipient can then reply to this message and thus form an email thread.

Several email clients deal with conversation detection by detecting email threads. The Internet message format RFC 2822 (see http://www.faqs.ord/rfcs/rfc2822.html) is a common standard that specifies a syntax for text messages within the framework of email systems. It does not provide a precise definition of an email thread, but instead defines how an email thread can be detected using structural attributes embedded in email messages.

FIG. 1 is an example of an email thread 100 and the attributes that can be used to detect it. This thread 100 contains a series of three messages 101, 102, 103 that compose a conversation thread between John and Mary. John first sends a message 101 to Mary, who then replies 102 to John's message, carbon copying (CCing) Bob to notify him about the discussion. In addition, Mary also modifies the subject line of her reply to welcome Bob. John then replies 103 to Mary's reply message, quoting her original message in the message content. Notice the "In-Reply-To", "References", and "Message-ID" attributes, which can be followed to detect the thread.

Thread detection based on structural attributes has some challenges:
- Not all email clients support the structural attributes required for detecting email threads.
- When the thread is broken, some systems may fail to detect the entire email thread. Say, for example, message $m_3$ is a reply to $m_2$, which is a reply to $m_1$, and $m_2$ is deleted. Systems that rely on the "In-Reply-To" attribute will fail to detect that thread.
- To continue a conversation, one may compose a new message rather than replying to an existing one. In most email clients, composing a new message initiates a new email thread. Therefore, the new message will not have any structural relationship with the original thread.
- One may reply to a message while modifying the recipients (as Mary did in FIG. 1, CCing Bob in her reply), changing the subject of the conversation (as Mary did), or changing the topic (as John did in his reply to Mary). This may indicate the initiation of a new conversation. However, the structural attributes embedded in the message as a result of the reply command will still link the newly composed message and the previous ones.

SUMMARY OF THE INVENTION

According to a first aspect of the present invention there is provided a method for conversation detection in email systems, comprising: grouping email messages as relating to a conversation by a similarity function based on a similarity of the email messages' attributes, the similarity function including: a similarity between the email messages' participants; and at least one of a similarity between the email messages' subjects or a similarity between the email messages' contents.

According to a second aspect of the present invention there is provided a system for conversation detection in email systems, comprising: a plurality of email messages each having defined attributes; means for grouping email messages as relating to a conversation by a similarity function based on a similarity of the email messages' attributes, the similarity function including: a similarity between the email messages' participants; and at least one of a similarity between the email messages' subjects or a similarity between the email messages' contents.

According to a third aspect of the present invention there is provided an email client system for conversation detection, comprising: a plurality of email messages each having defined attributes; a graphical user interface for displaying messages, including: means for displaying email messages grouped as relating to a conversation by a similarity function based on a similarity of the email messages' attributes, the similarity function including: a similarity between the email messages' participants; and at least one of a similarity between the email messages' subjects and a similarity between the email messages' contents.

According to a fourth aspect of the present invention there is provided a computer program product stored on a computer readable storage medium for conversation detection in email systems, comprising computer readable program code means for performing the step of: grouping email messages as relating to a conversation by a similarity function based on a similarity of the email messages' attributes, the similarity function including: a similarity between the email messages' participants; and at least one of a similarity between the email messages' subjects or a similarity between the email messages' contents.

In the described method, the path of conversation is detected based on email attributes. A thread is defined and detected according to the RFC 2822 standard, while a conversation is defined herein as an exchange of messages among the "same" group of people on the "same" topic. Messages are grouped into coherent conversations by using a similarity function that takes into consideration relevant email attributes, such as message subject, participants, date of submission, and message content. Structural attributes are intentionally ignored such as the "In-Reply-To" field, which may link messages belonging to different conversations and may or may not be supported by the email client.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The process of detecting conversations from a collection of email messages is described. First, the basic concepts used in this work are defined.

Figure 1:
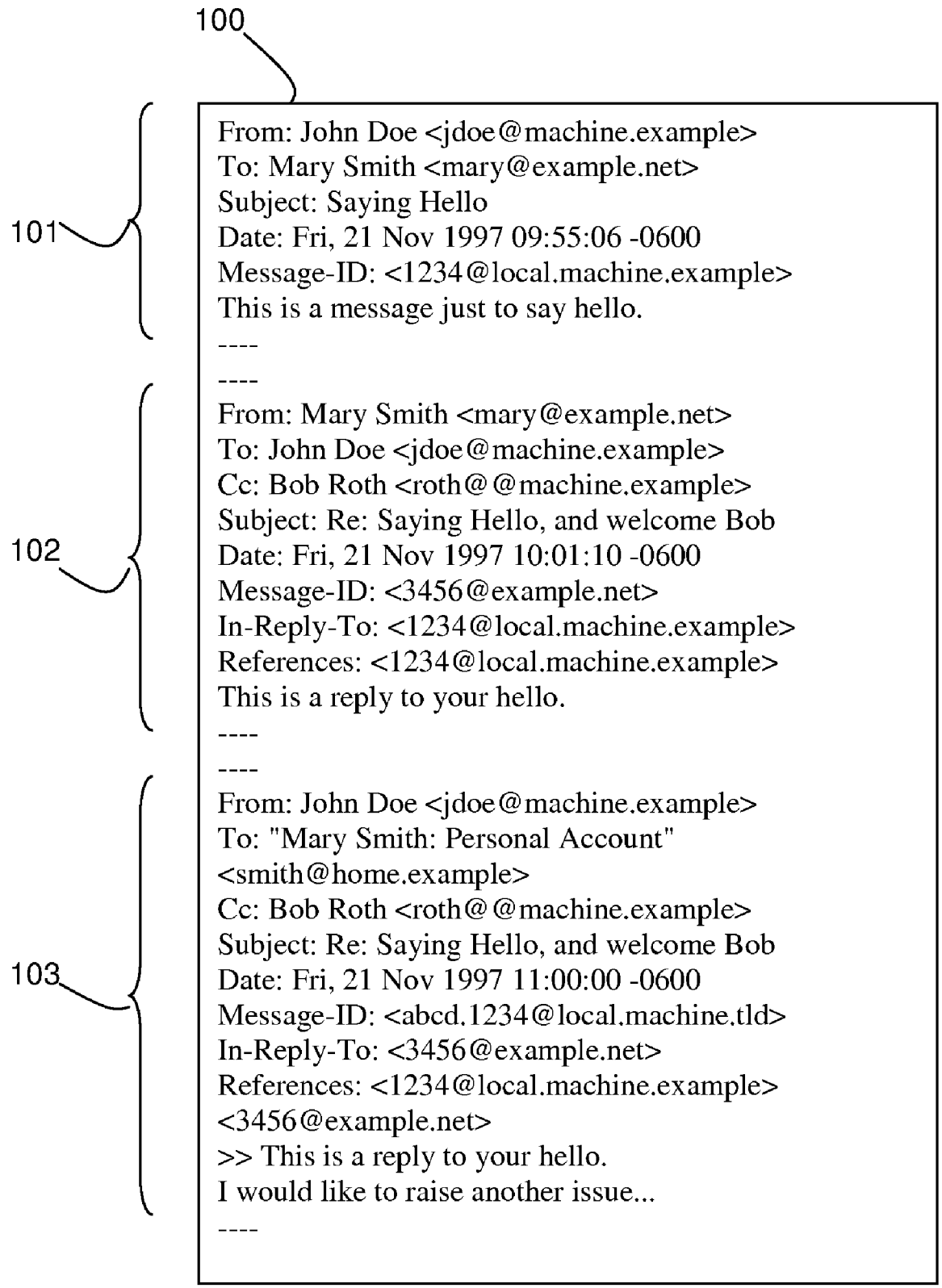
FIG. 1 is a diagram of an email message thread as known in the prior art.

An "email thread" is a sequence of messages, ordered by their date of submission, that are related based on their structural attributes. Two messages, $e_1$ and $e_2$ belong to the same email thread if, and only if, without loss of generality, $e_1$ references $e_2$ through its structural attributes as defined by the Internet standard RFC 2822. FIG. 1 provides an example of such an email thread.

A "subject-thread" is a sequence of messages, ordered by their date of submission, that are related based on to their subject attribute regardless of their structural relationships. Two messages, $e_1$ and $e_2$ belong to the same subject-thread if, and only if, their "core" subject is identical. A "core" subject is extracted from the full message subject by eliminating common prefixes such as "Re:", "Re: Re:", "Fwd:", etc., which are very common in email systems.

A "sub-conversation" is a sequence of messages, ordered by their date of submission, that belong to a subject-thread, focus on the same topic, and are sent among the same group of people. It should be noted that the notion the "same" is different from "identical", and will be defined precisely below.

A subject-thread may contain more than one sub-conversation. Sub-conversations can originate when one thread participant breaks a subject-thread by replying to a message while keeping the subject and changing the topic or modifying the participants. Another indication for a new conversation within the same subject-thread is a long time break between two consecutive messages. Some users may reply to a message as a means to initiate a new conversation, thereby saving the time of retyping the addresses of the participants. In addition, users may compose a new message on a different topic, but use the same subject that appeared in previous messages. Such a message will be part of the subject-thread, as determined by its subject, but will belong to a different sub-conversation. A sub-conversation is a special type of conversation for which all messages share the same subject line.

Several sub-conversations, belonging to the same subject-thread or to different subject-threads, can also be grouped together to compose a "conversation". A conversation is a sub-conversation, or a union of sub-conversations that focus on the same topic and are among the same group of people.

The described method and system partition email messages into conversations by measuring the similarity between the attributes of the email messages. Different attributes may be weighted to give an accurate partitioning into conversations for a particular mailbox or group of mailboxes.

The described method analyzes a mailbox and extracts the following features from the emails in the mailbox:

Subject—the subject attribute of the emails;

Participants—an aggregation of the From, To and Cc attributes;

Date—the date attribute;

Content—the text of the email, split to its history parts. In some email applications, the previous content is appended to the new email's content forming one or more history or quoted parts. The content of the email is split into all the parts so as not to treat it as a single consecutive text part.

As will be discussed later in this document, not all the attributes need to be used to partition the emails into conversations.

Figure 2:
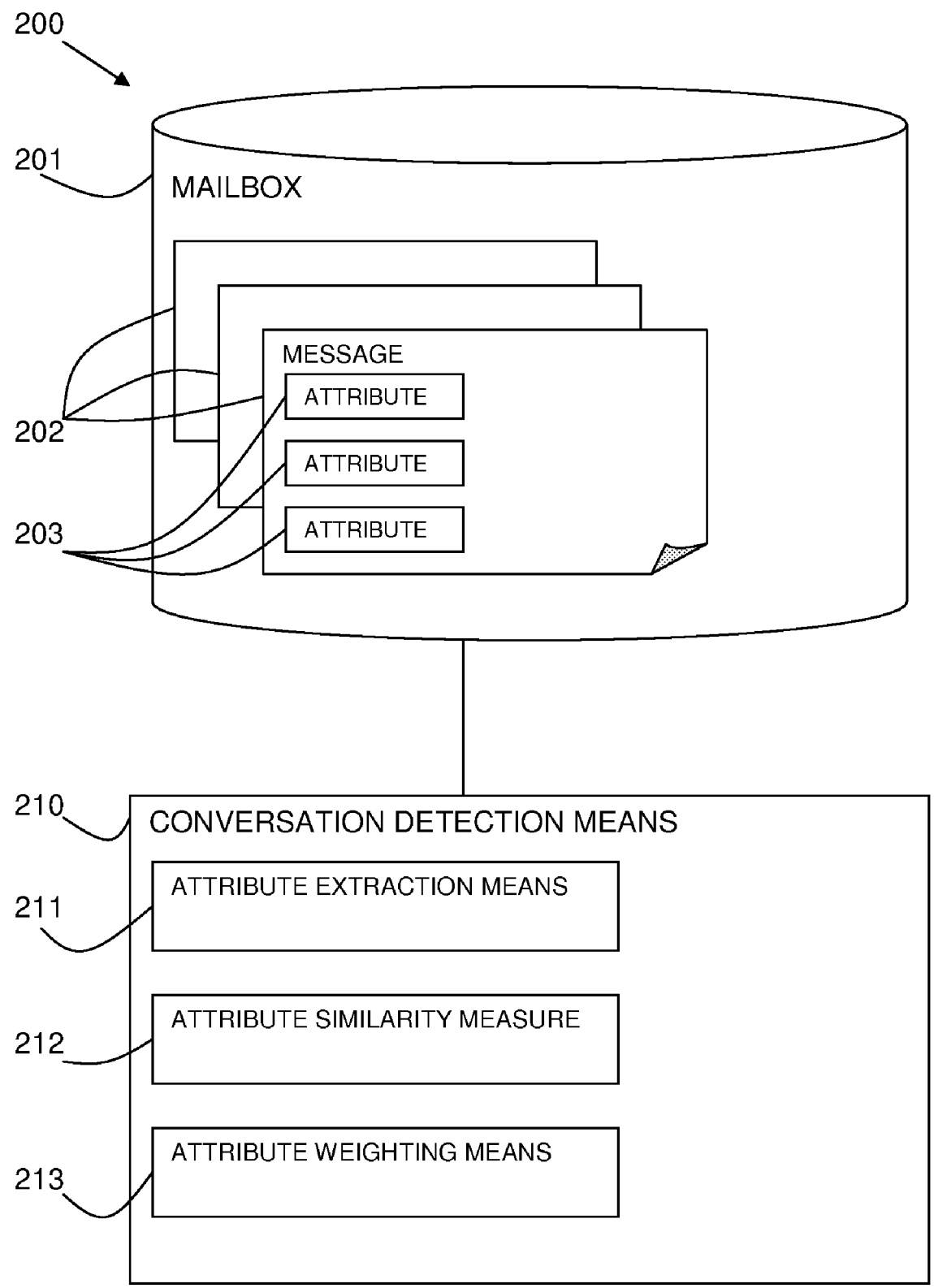
FIG. 2 is a block diagram of a system in accordance with the present invention.

Referring to FIG. 2, a block diagram shows an email system 200 including a mailbox 201 containing a plurality of email messages 202 each email message having multiple attributes 203.

The email system 200 includes a conversation detection means 210 including means to extract 211 attributes from the email messages 202, means for comparing 212 attribute similarity, and means for weighting 213 the attributes.

The similarity between two messages 202 is measured as a linear combination of the similarity between their attributes 203. In the following, it is described how the similarity between message attributes is measured.

Subject Similarity

In general, the subject attribute of a message is a short title of the message topic. The similarity of two subject attributes is determined by the subject words. In one example embodiment, the Dice similarity coefficient is used to calculate the similarity of subject attributes. Let $S_i$ and $S_j$ be the set of words belonging to the core subject attributes of two messages, $e_i$ and $e_j$, respectively. Then the subject similarity is defined as:

$$subj(e_i, e_j) = \frac{2|S_i \cap S_j|}{|S_i| + |S_j|} \quad (1)$$

Note that two messages with an identical core subject are maximally scored by that function, while messages with disjoint subjects are scored by zero. Messages with similar subjects (followed by a slight modification of one of the subjects) are still scored highly.

Since all messages belonging to a subject-thread, or to a sub-conversation, share the same core subject attribute, that subject is defined as the subject-thread (or sub-conversation) subject. For a conversation containing several sub-conversations, the subject attribute is determined by concatenating the subjects of all sub-conversations. Therefore, the same function will be used to measure subject similarity between conversations.

Date Similarity

Date attributes are highly important for detecting conversations. A reasonable response time for an email message is approximately five days after it has been sent, while most messages are replied to in a matter of hours. A reply to a message after a very long time indicates the replier's intention to revive the conversation. However, from many perspectives, it will be wiser to consider such an answer as an initiative to begin a new conversation.

Therefore, the date similarity between two messages should decay as their date difference grows. In addition, a "max date difference" threshold, mdf, is used above which the date similarity is zeroed. Let $d_i$ and $d_j$ be the date attributes of two messages $e_i$ and $e_j$, respectively. The date similarity of two messages is defined as:

$$\text{date}(e_i, e_j) = 1 - \min\left(1, \frac{|d_i - d_j|}{mdf}\right) \quad (2)$$

The date of a conversation is defined as a $(d_s, d_e)$ pair, where $d_s$ and $d_e$ are set to the earliest and latest dates of all messages in the conversation. Let $(d_{si}, d_{ei})$ and $(d_{sj}, d_{ej})$ be the date attributes of two conversations, $c_i$ and $c_j$ respectively, and without loss of generality let $d_{si} \leq d_{sj}$. The date similarity of two conversations is defined as:
- If $d_{ej} \leq d_{ei}$ then conversation is $c_j$ is fully contained in $c_i$ and date($c_i$, $c_j$)=1.
- If $d_{ei} \leq d_{sj}$ then the conversations are disjoint. If $d_{ei} > d_{sj}$ then the conversations intersect. In both cases date($s_i$, $s_j$) is computed using Equation 2, where $d_i = d_{ei}$ and $d_j = d_{sj}$.

Participant Similarity

The participants attribute is determined by an aggregation of all participants mentioned in the From, To, and Cc attributes of the message.

The similarity of participants is defined, using a variant of the Dice similarity (Equation 1), taking the activity role of participants into consideration. A distinction is made between active and passive participants. As noted before, passive participants are very common in email conversations, especially in the enterprise. Passive participants in one message who are missed in another message can highly affect the similarity of participants as calculated using the Dice similarity coefficient, even if their contribution to the discussion is negligible.

Let $S_i$ and $S_j$ be the sets of participants in messages $e_i$ and $e_j$, respectively, including the mailbox owner (the mailbox owner is included since she might have a different activity role in the two messages). Let $w(p, e)$ be the activity weight of participant p in message e. A high activity weight is associated for active participants (from the From and To message attributes), a lower weight for passive ones (from the Cc attribute), and a zero weight when p does not participate in e. Since participants may have different activity roles in the two messages, the activity weights of the participants are averaged over the two messages:

$$aw(p, e_i, e_j) = \frac{w(p, e_i) + w(p, e_j)}{2}.$$

The similarity of participants between two messages is defined as:

$$\text{part}(e_i, e_j) = \frac{\sum_{p \in S_i \cap S_j} aw(p, e_i, e_j)}{\sum_{p \in S_i \cup S_j} aw(p, e_i, e_j)} \quad (3)$$

The similarity function returns the sum of activity weights of the joint participants in the two messages, normalized by the sum of the weights of all participants (including those who are absent in one of the messages). This function is highly affected by the absence of active participants from one of the messages and less affected in the absence of passive ones. For a conversation, the average activity weight of a participant is determined by averaging his/her activity weight over the sequence of messages:

$$aw(p, (e_1, \ldots, e_k)) = \frac{\sum_{i=1}^{k} w(p, e_i)}{k}.$$

Hence, Equation 3 can also be used to measure the similarity of participants between such instances, using the average weight of participants over the sequence of messages.

Content Similarity

While creating a reply message, many email clients automatically quote the previous message content in the reply. In a long thread of messages, the quoted part of some messages might be very long as compared to their unquoted part (which may contain only few lines of text). For example, consider a sequence of messages ($e_1, \ldots, e_k$) where the email client quotes each message in the previous message. The content of $e_k$ will include the content of all previous messages, along with its own unquoted part. Text similarity between the content of the first message, $e_1$, and the content of $e_k$, will likely to be low since $e_k$ contains many other quoted messages. Furthermore, if the topic has drifted during the thread, the content of $e_1$ may be unrelated to the unquoted content of $e_k$.

Therefore the content of a message is split into its quoted and unquoted parts, while the quoted part is recursively split into its quoted and unquoted parts. Splitting the content of a message can be done using the email client's internal API (if available) or using some method based on the internal representation of the quoted part of a message. For example, many email clients mark the quoted part of a message by preceding '>'.

The process begins with two messages, $e_i$ and $e_j$, with their corresponding elements $e_{i1}, \ldots, e_{im}$ and $e_{j1}, \ldots, e_{jn}$, as extracted from the message content. In addition, and without loss of generality, let date($e_i$)>date($e_j$). Compute the textual similarity between each element in $e_j$ to the unquoted part of $e_i$ using a standard cosine similarity measure, taking the maximum value as the similarity measure between the two messages. The motivation behind this is that when the unquoted content of the new message, $e_i$, is similar to one of the elements of $e_j$, then $e_i$ relates to the conversation $e_j$ belongs to.

Comparing the message sub-elements copes well with cases where $e_i$ is a reply to $e_j$ but the replied text is interleaved with $e_j$'s content; this often occurs in corporate email, when the replier adds his or her reply within the content of the previous message. This usually indicates that $e_i$ and $e_j$ belong to the same conversation.

The similarity between two elements is calculated using the standard tf–idf cosine similarity. Assume n terms in the vocabulary. For each element $el_i$, the term frequency of term $t_k$ (the number of occurrences in the element text) is referred to as $tf_{ik}$ and to the document frequency of $t_k$ (the number of messages in the mailbox containing it) as $df_k$. The weight $w_{ik}$ is defined as $$w_{ik} = \log(tf_{ik} + 1)\log\frac{N}{df_k},$$

where N is the number of messages in the mailbox.

Given two elements $el_i$ and $el_j$, the similarity between them is calculated by the cosine similarity:

$$sim(el_i, el_j) = \frac{\sum_{k=1}^{n} w_{ik} \cdot w_{jk}}{\sqrt{\sum_{k=1}^{n} (w_{ik})^2} \cdot \sqrt{\sum_{k=1}^{n} (w_{jk})^2}} \quad (4)$$

Given $el_{ui}$, the unquoted part of message $e_i$, and $el_{j1} \ldots el_{jk}$, the elements of message $e_j$, the content similarity between two messages ($e_i$, $e_j$) is defined as:

$$content(e_i, e_j) = \max_{1 \leq t \leq k} sim(el_{ui}, el_{jt}) \quad (5)$$

For a sub-conversation $S_i$, the content attribute includes the unique set of elements from all its messages. The content similarity between a message $e_k$ and sub-conversation $S_i$, content($e_k$, $S_i$), is calculated using Equation 5, only the unquoted part of $e_k$ is compared to all the elements of $S_i$.

Given two sub-conversations $S_i$ and $S_j$ with their corresponding unique elements $S_{i1}, \ldots, S_{im}$ and $S_{j1}, \ldots, S_{jn}$, the similarity between all elements of $S_i$ to all elements of $S_j$ is computed using Equation 4. The content similarity between two sub-conversations, content($S_i$, $S_j$), is defined as:

$$content(S_i, S_j) = \max_{\substack{1 \leq t \leq m \\ 1 \leq k \leq n}} sim(S_{it}, S_{jk}) \quad (6)$$

Similarity Function

The similarity between two messages, $e_i$ and $e_j$ is computed by a linear combination of the similarities between their attributes:

$$sim(e_i, e_j) = w_d \times date(e_i, e_j) + \quad (7)$$
$$w_p \times part(e_i, e_j) + w_b \times body(e_i, e_j) + w_s \times subj(e_i, e_j)$$

Since all similarity functions of all attributes are also defined for conversation attributes, Equation 7 can also be used to measure the similarity between such instances. In addition, the relative weights used by this function can be tuned to optimally fit the detection algorithm described in the next subsection over one specific mailbox.

Conversation Detection Algorithm

This section describes the algorithm used to detect conversations. The clustering algorithm is applied several times to different email sets. In the first step, it clusters messages by their subject attribute; all messages with an identical core subject attribute are grouped together into a subject-thread. The algorithm is then applied on messages in each subject-thread, grouping them into sub-conversations based on their similarity matching (using Equation 7). In the third phase, it is applied to the set of sub-conversations, grouping similar sub-conversations into conversations (using Equation 7).

The clustering algorithm efficiently exploits the order between messages. In an ordered set of messages, a message $e_i$ cannot be a reply to any message $e_j$, where j>i. Therefore, after processing messages $e_1, \ldots, e_n$, there is no need to re-cluster them when new messages arrive. This is similar to many clustering algorithms over a stream of data.

Formally, detecting conversations uses the following steps:
1. Detect subject-threads: Group messages with identical core subject attribute (after removing "re:" "fw:", "fwd:" etc. prefixes).
2. Break a subject-thread into sub-conversations:
   Sort all messages belonging to a subject-thread by their date attribute.
   Group messages belonging to a specific subject-thread into sub-conversations based on their similarity matching (using Equation 7). Messages are considered similar when their similarity exceeds a certain threshold. Since all messages belonging to a subject-thread have an identical subject attribute, ignore this attribute at this stage by zeroing the subject coefficient weight in the equation, $w_s=0$.
3. Group sub-conversations into conversations:
   Sort all sub-conversations by their starting date (the $d_s$ part of their date attribute pair ($d_s$, $d_e$)).
   Group sub-conversations into conversations based on their similarity matching (using Equation 7). Sub-conversations are considered similar when their similarity exceeds a certain threshold. Note that in this phase, sub-conversations belonging to the same subject-thread might be regrouped together, when their content is highly similar. At this stage, the content similarity plays a major role in the similarity measurement while the date similarity is almost neglected. In addition, since subjects play important role in similarity measurement for sub-conversations belonging to different subject-threads, $w_s>0$.

Figure 3:
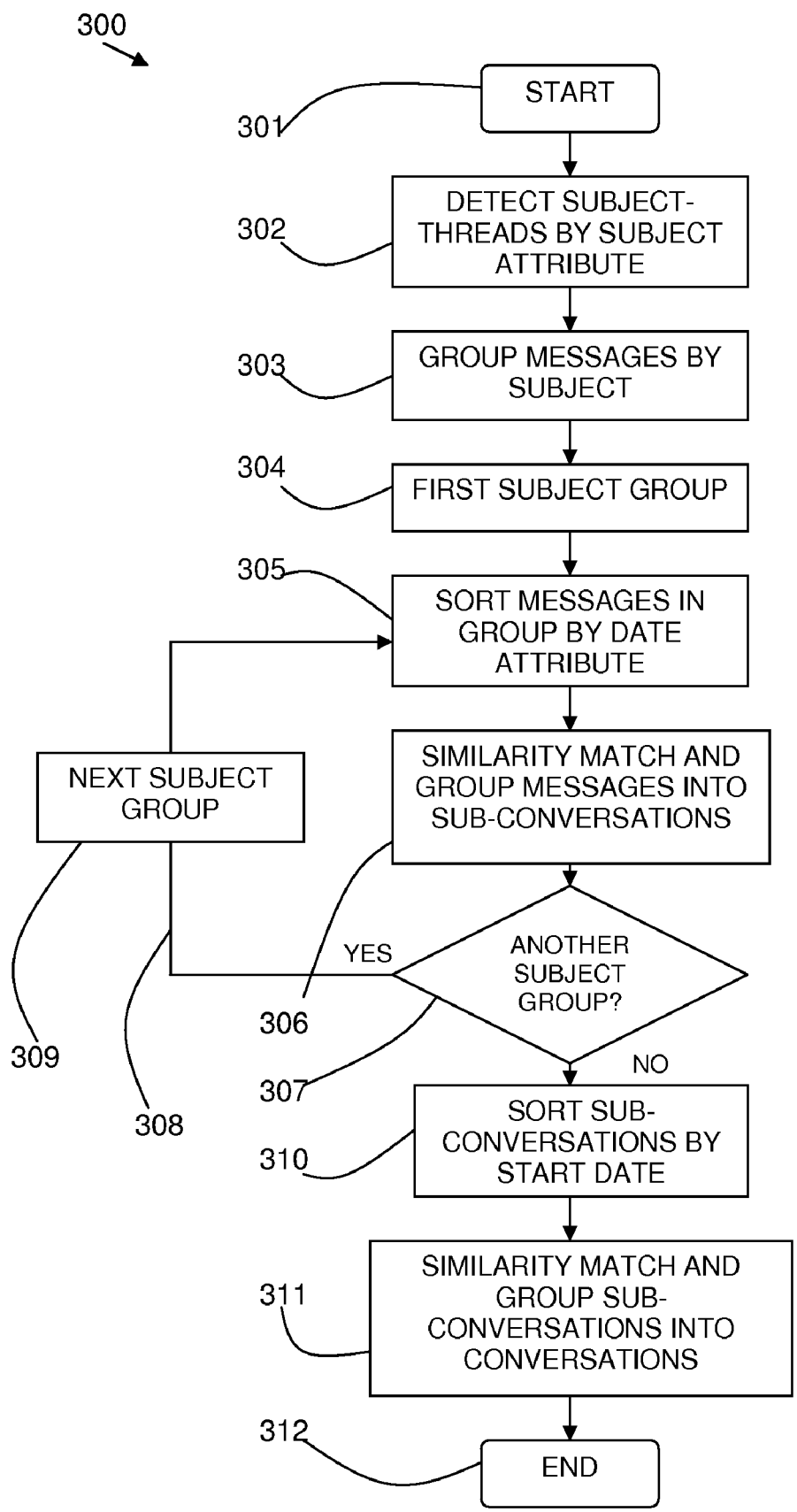
FIG. 3 is a flow diagram of a method of conversation detection in accordance with the present invention.

Referring to FIG. 3 a flow diagram 300 shows the above method. The flow diagram starts 301 and subject-threads are detected 302. Messages are grouped with identical core subject attributes 303.

A first subject group is taken 304 and the messages in the group are sorted 305 by date attribute. The messages are then similarity matched and grouped 306 according to their similarity into sub-conversations. It is then determined 307 if there is a next subject group and, if so, the method loops 308 to the next subject group 309. The method steps 305 and 306 are repeated. When there are no more subject groups, this results in sub-conversations across all subject attributes.

The sub-conversations are then sorted 310 by start date attribute. The sub-conversations are then similarity matched and grouped 311 according to their similarity into conversations. The method ends 312.

Figure 4:
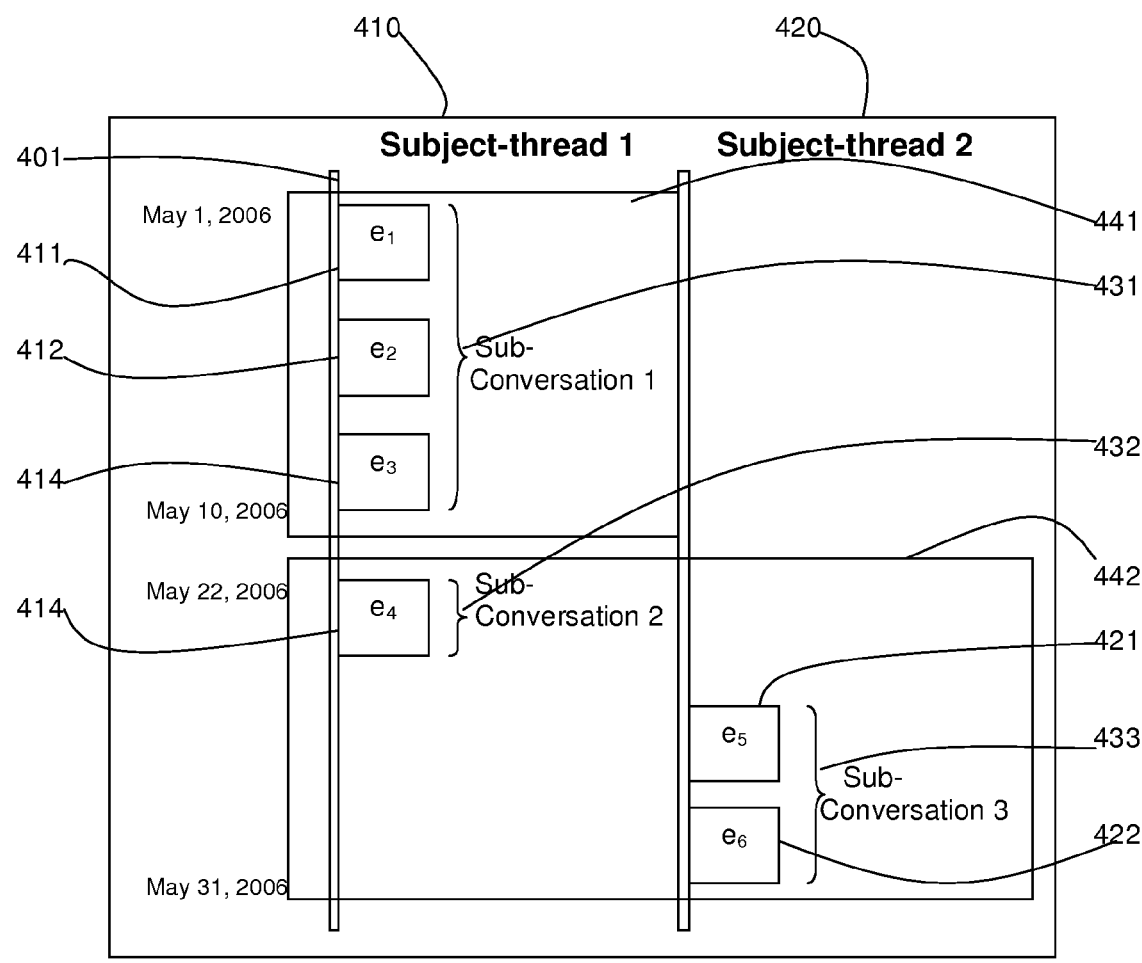
FIG. 4 is a schematic diagram showing conversation detection in accordance with the present invention.

FIG. 4 illustrates how conversations are formed. An example group of messages are shown along a timeline 401. The first four messages 411-414 are part of a first subject-thread 410. A further two subsequent messages 421-422 are part of a second subject-thread 420.

However, the fourth message 414 is actually starting a new topic even through it is under the first subject-thread 410. Therefore, the messages can be partitioned into a first sub-conversation 431 containing the first three messages 411-413 of the first subject-thread 410, a second sub-conversation 432 containing the message 414 from the first subject-thread 410 which relates to a different topic, and a third sub-conversation 433 containing the two messages 421-422 of the second subject-thread 420.

A first conversation 441 is formed of the first sub-conversation 431, and a second conversation 442 is formed of the second and third sub-conversations 432, 433. The message 414 from the first subject-thread 410 in the second sub-conversation has a high similarity rating to the third sub-conversation 433 of the second subject-thread 420.

The clustering algorithm can also be applied incrementally. Sorting messages and conversations by their date attributes allows a new arriving message to be efficiently compared to all the conversations detected so far. If a good candidate is found (if the message is very similar to one of the conversations), this message can be added to that conversation. Otherwise, a new conversation is started.

The quality of the conversation detection process has been measured by comparing the detected conversations to manually marked conversations.

Evaluation of Email Threads

To evaluate the applicability of using email threads for conversation detection, email threads that were extracted by tracking the "In-Reply-To" attribute of the messages were compared to the manual partition of messages into conversations. The evaluation score was 0.679 in a first mailbox, mailbox A, and 0.377 in a second mailbox, mailbox B. This provides a baseline score for all alternative detection processes.

Evaluation of Subject-threads

To evaluate the applicability of using subject-threads for conversation detection, the subject-threads detected by accumulating messages with identical subject attribute were compared to the manual partition. The evaluation score is improved to 0.872 for mailbox A and 0.701 for mailbox B, demonstrating the superiority of subject-threads over email threads for the conversation detection task. Furthermore, subject-thread detection can be implemented very efficiently, using standard indexing techniques, which is an important consideration for very large mailboxes.

Evaluation of Sub-conversations

To evaluate the applicability of using sub-conversations for conversation detection, the following steps were carried out:
1. Manually break subject-threads into sub-conversations. In this step, only multi-message subject-threads are considered, since single-message subject-threads cannot be split.
2. Automatically break subject-threads into sub-conversations using the described algorithm. Here, different coefficients can be applied to the similarity function defined in Equation 7.
3. Evaluate the similarity between the two partitions.

Table 1 below shows sub-conversation detection results, using different coefficient weights in Equation 7 (mailboxes A and B respectively).

| Coeff. | Independent | | | Pairs | | | All |
|---|---|---|---|---|---|---|---|
| Date | 1.00 | 0.00 | 0.00 | 0.50 | 0.50 | 0.00 | 0.50 |
| Content | 0.00 | 1.00 | 0.00 | 0.00 | 0.50 | 0.50 | 0.20 |
| Participants | 0.00 | 0.00 | 1.00 | 0.50 | 0.00 | 0.50 | 0.30 |
| Score A | 0.98 | 0.91 | 0.87 | 0.89 | 0.93 | 0.90 | 0.99 |
| Score B | 0.97 | 0.84 | 0.85 | 0.97 | 0.86 | 0.84 | 0.99 |

The results given in Table 1 demonstrate the significance of considering all message features by the similarity function, (date, content and participants). The "Independent" columns show the results of considering only a single attribute to detect sub-conversations. As can be seen, the date attribute alone detects high-quality sub-conversations and omitting it hurts the detection quality. The "Pairs" columns show the results of considering two attributes at a time with equal weights, while zeroing the third. The results show that the owner of mailbox A values the content attribute more than the owner of mailbox B, who values the date attribute the most. Column "All" shows that considering all the attributes gives better results than considering only a subset of them. The coefficient weights were selected empirically after applying various weights combinations. The detection quality for both mailboxes was very high (0.99), which suggests that detecting sub-conversations in subject-threads is an easy task and that both mailbox owners mutually agree on the importance of each message attribute for the task.

Impact of Max Date Difference Threshold

The impact of the max date difference (mdf) threshold used in the date similarity function on the sub-conversation detection task has also been evaluated. This parameter determines a maximum threshold on the date difference between two messages after which they no longer belong to the same conversation. Sub-conversations were detected by splitting multi-message subject-threads using different mdf values and evaluated the partitions. The coefficient weights in the similarity function were the same as the set of values given in the column "All" of Table 1.

The results show that the optimal mdf threshold for the two mailboxes is approximately 10 days. A threshold that is too low will decrease the detection quality. Increasing mdf over 10 days did not improve the detection process. This may suggest that either, (a) all messages in this mailbox were replied to in less than 10 days, or (b) a reply to a message after more than 10 days is no longer considered to be part of the same conversation.

Evaluation of Conversation Detection

To evaluate the applicability of the conversation detection process, the following was carried out:
1. Manually group the (manually marked) sub-conversations into conversations, including the single-message ones.
2. Automatically group the automatically detected sub-conversations into conversations, applying the conversion detection algorithm described above with different coefficient weights for the similarity function.
3. Evaluate the similarity between the two partitions.

The results are given in Table 2 below which shows conversation detection results using different coefficient weights in Equation 7 (for mailboxes A and B respectively).

| Coeff. | Independent | | | | All 1 | All 2 |
|---|---|---|---|---|---|---|
| Date | 1.00 | 0.00 | 0.00 | 0.00 | 0.05 | 0.05 |
| Content | 0.00 | 1.00 | 0.00 | 0.00 | 0.40 | 0.60 |
| Participants | 0.00 | 0.00 | 1.00 | 0.00 | 0.25 | 0.10 |
| Subject | 0.00 | 0.00 | 0.00 | 1.00 | 0.30 | 0.25 |
| Score A | 0.93 | 0.93 | 0.91 | 0.92 | 0.96 | 0.92 |
| Score B | 0.71 | 0.82 | 0.72 | 0.79 | 0.85 | 0.90 |

The "Independent" columns in Table 2 show the results of considering only a single attribute to detect conversations. As can be seen, for both mailboxes the content attribute detects high-quality conversations. When omitted, the detection quality of mailbox B reduces, while for mailbox A the reduction is less significant. Columns "All 1" and "All 2" show that considering all the attributes gives better results than considering only a subset of them. The coefficient weights were selected empirically after applying various weights combinations. The detection quality for both mailboxes was higher when considering all message attributes than only independent ones. In addition, the results show that to get higher-quality conversations for mailbox B, the content attribute should be weighted higher than for mailbox A. This shows that detecting conversations in a mailbox is not an intuitive task and that different coefficient weights apply to different mailbox owners. However, Table 2 shows that both mailbox owners consider the date attribute as almost insignificant for the conversation detection task, and that the content attribute is more important than the subject attribute, which is more important than the participants attribute.

Figure 5:
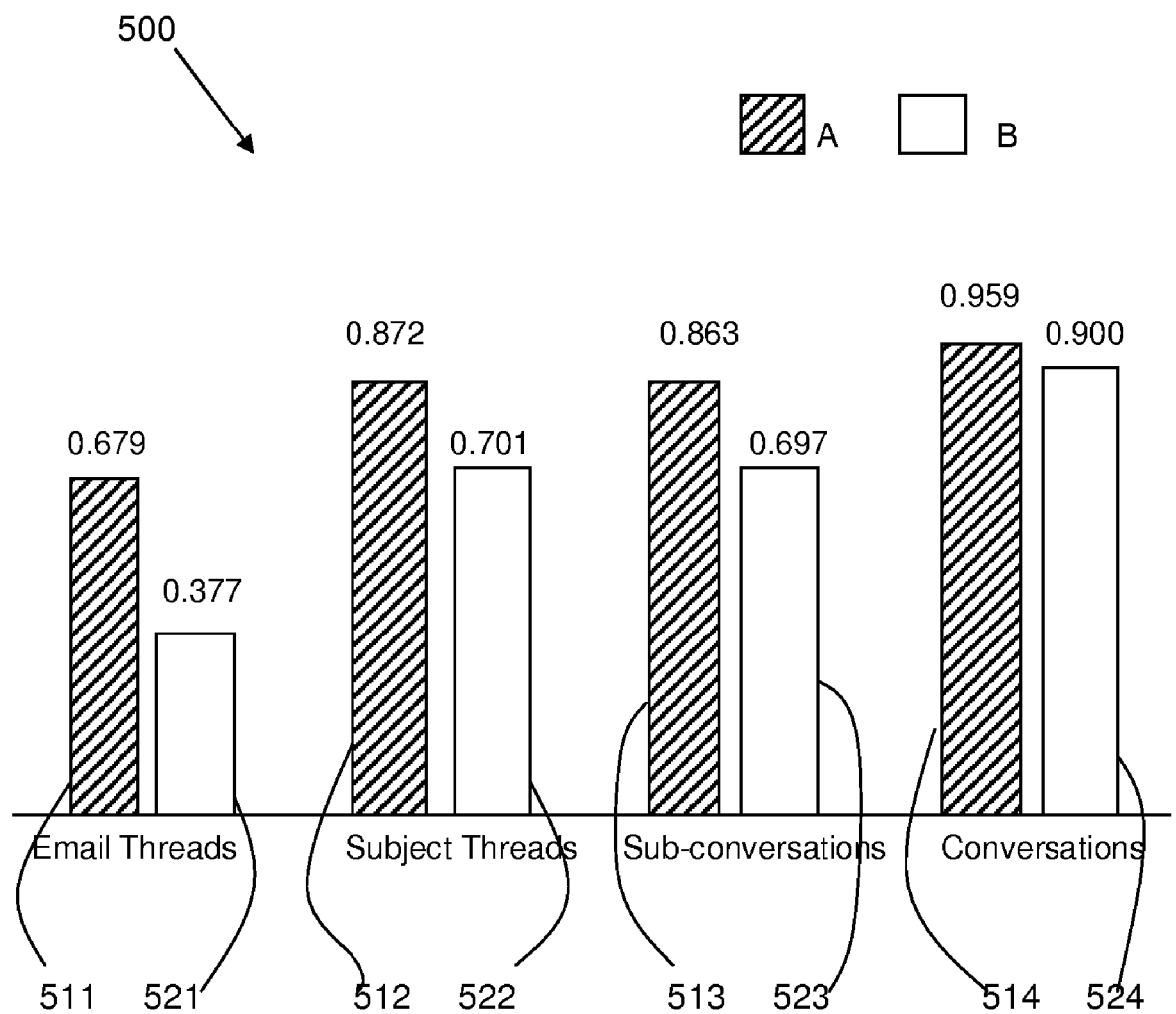
FIG. 5 is a graph showing the results of conversation detection methods in accordance with the present invention.

The evaluation scores of the different detection methods based on email threads, subject-threads, sub-conversations and automatic detected conversations has also been studied and the results are shown in the graph 500 of FIG. 5. FIG. 5 shows the evaluation scores for mailbox A (with darker shading) for email threads 511, subject-threads 512, sub-conversations 513, and conversations 514. FIG. 5 also shows the evaluation scores for mailbox B (with lighter shading) for email threads 521, subject-threads 522, sub-conversations 523, and conversations 524.

Coefficients Weights Selection

The coefficient weights in the "All" columns in Tables 1 and 2 were selected empirically after applying various weights combinations. However, as the results show, the weights in column "All 1" in Table 2 are better for mailbox A than for mailbox B. The weights in column "All 2" are better for mailbox B, and although mailbox A's score is still higher, it is lower than in column "All 1". The weights somewhat reflect the mailbox owner's opinion on what constitutes a conversation. Therefore, although the algorithm can start with the weights given in Table 2, it would be advantageous to learn and adjust the proper weights for a mailbox over time.

One way to learn the appropriate weights for a given mailbox is to use machine learning techniques. Lewis and Gale (Lewis, D. D. and Gale, A. W., 1994) describe an algorithm for sequential sampling during machine learning of statistical classifiers. They outline a general algorithm for teaching a classifier:

1. Create an initial classifier;
2. While the teacher is willing to label examples:
    (a) Apply the current classifier to each unlabeled example;
    (b) Find the b examples for which the classifier is least certain of class membership;
    (c) Have the teacher label the sub-sample of b examples;
    (d) Train a new classifier on all new examples.

By adjusting the described algorithm to the conversation detection task, the conversation detection algorithm can be improved over time:

1. Partition the mailbox to conversations using initial weights as described in Table 2;
2. Adjust the weights upon user selection of conversations:
    (a) If the algorithm is uncertain which conversation a message belongs to, display a list of candidate conversations and have the user select one;
    (b) When the user selects a conversation, add this message and conversation to the set of labelled examples and train the algorithm to adjust its weights;
3. Adjust the weights upon user modifications to conversations:
    (a) Allow the user to move messages between conversations;
    (b) When the user moves a message between conversations, add the message and both conversations to the set of labelled examples and train the algorithm to adjust its weights.

Discussion

The results shown in Table 1 demonstrate the importance of the date attribute for detecting sub-conversations within subject-threads. However, it cannot detect a drift in the topic of a conversation, or a change in participants. From prior studies, in corporate emails most messages are replied in less than 5 days since they were sent. The results in Table 1 (the run with the date attribute alone) somewhat strengthens this finding. This run suggests that in most cases, when the date difference exceeds the threshold, a new conversion emerges.

Table 2 shows that the content and subject attributes of messages are the most significant features for conversation detection. The significance of date distance between sub-conversations is negligible (for both mailboxes) and may be discarded altogether for this specific task. It follows that two different sub-conversations extracted from the same subject thread, might be re-grouped together to construct a conversation as a result of their content similarity, despite the time distance between the messages, which probably caused them to be split into two different sub-conversations. In addition, Table 2 shows that both mailbox owners consider the content attribute as more important than the subject attribute, which is more important than the participants attribute. This suggests that although the date attribute is very important to detect sub-conversations, the textual portion of a message (content and subject attributes) is more important for detecting conversations.

FIG. 5 compares the similarity between email threads, subject threads, sub-conversations, and conversations, to manually detected conversations in two mailboxes. It shows very clearly the drawbacks of email threads for this task. It also shows that subject threads encapsulate most conversations in the mailbox; however, they are inferior to the automatically detected conversations. Sub-conversations alone, as expected, are inferior to detecting full conversations as they are only part of the process. However, FIG. 5 shows that they are also inferior to subject threads. The reason is that some of the sub-conversations represent partial conversations, which are scored lower than the subject threads containing them, while the full conversations that include those partial sub-conversations are only detected by the final stage of the algorithm.

In conclusion, for optimal results in detecting conversations in email messages, all message attributes may be considered. Using all the attributes for measuring similarity gave the highest results in both experiments of sub-conversation and conversation detection. However, a sub-group of the attributes may be used such as the participants and one or both of the textual contributors of the subject and content. Furthermore, different attributes and weightings may be used for sub-conversation detection as compared to conversation detection.

In addition, it has been shown that breaking subject-threads into sub-conversations, and then grouping similar sub-conversations together, is a superior detection process to alternative approaches.

Conversations detected in the email system can benefit applications that rely on email threads from the end user's perspective. For example, email summarization methods described may produce better summaries for the end user when coherent conversations are used rather than email threads. Similarly, visualization systems might better display conversations to the end user rather than email threads.

Figure 6:
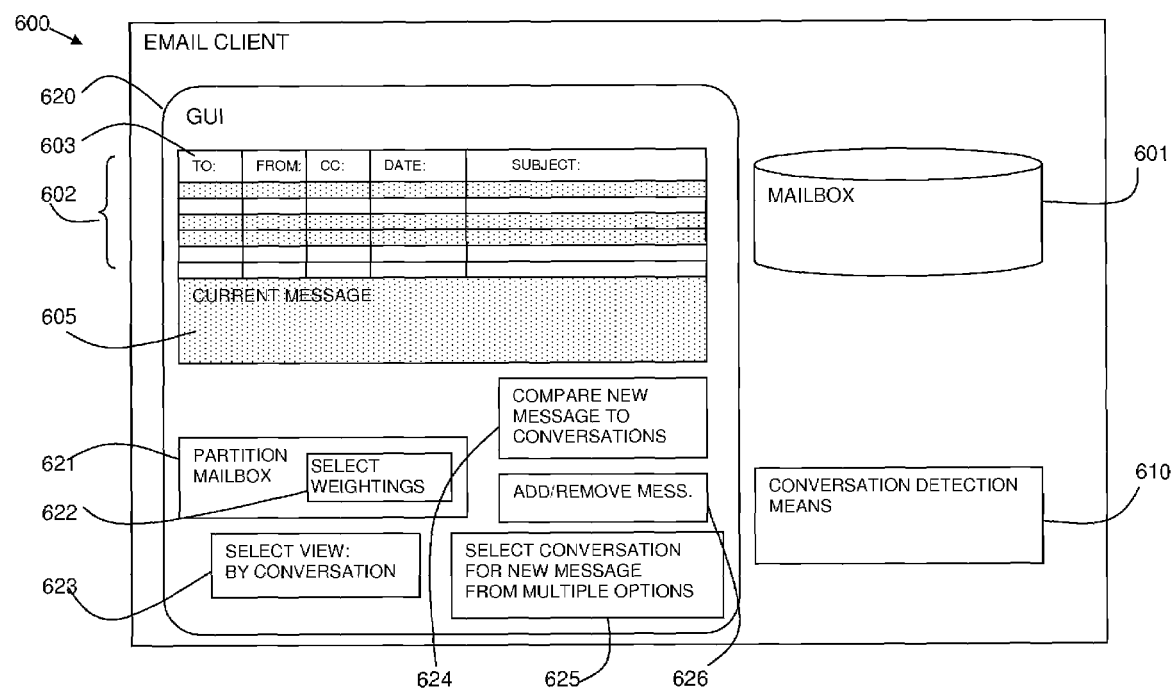
FIG. 6 is a block diagram of an email system in which the present invention may be implemented.

Referring to FIG. 6, a block diagram of an example embodiment of an email client 600 is shown. The email client 600 includes a mailbox 601 and a graphical user interface (GUI) 620 for displaying email messages 602 within the mailbox 601. The email client 600 includes a conversation detection means 610.

The GUI 620 displays email messages 602 which have been received and sent to and from the email client 600. The email messages 602 include attributes 603 such as the recipients, the sender, the date, the subject, etc. A current message 605 also has the content of the message displayed.

Messages 602 in an email client 600 may be displayed in the GUI 620 by grouping such as by messages belonging to a single message thread. In the described system, selection means 621 are provided for a user to select via the GUI 620 to partition a mailbox by conversation. The selection means 621 may include options which can be entered for adjusting the weightings 622 of the attributes in the conversation partitioning. Means are also provided for selecting a type of view 623 to enable the user to change between viewing messages by thread, by conversation, etc.

When a new message arrives, a comparing means 624 may be selected to compare the new message to existing conversations. If there are several conversation options for a new message, a selection means 625 may be provided for user selection of the most appropriate conversation. Means are provided for a user to add/remove 626 a message 602 from a conversation in order for the user to control the conversation contents.

Detecting conversations in a mailbox is a very subjective task. Two people may define a conversation differently. A definition for a conversation is defined here and an algorithm to detect them in a mailbox. However, the algorithm can be tuned to better answer a user's definition of a conversation by assigning different weights to the attributes.

The email client will offer the user to view his emails by conversations. Many email clients already offer the user several views, like "Folders", "By Priority" and "Threads". By detecting conversations, either the "Threads" view can be improved (by displaying more coherent conversations), or by creating a new view "By Conversations".

When a new message arrives, the email client can associate the email with an existing conversation, or, if several conversations are "good candidates", offer the user to select from any of them. In addition, the client can include an "unprocessed" folder which will store all the emails it was not able to decide. The user can at a later time process all the emails in the folder, by having the email client suggesting appropriate conversations to choose from. In addition, users will be able to manually combine or split conversations suggested by the system to better classify their messages into coherent conversations.

Also, the email client may provide a separate folder to store the received email that could not be related to any previous conversations. The email client provides the user with the various appropriate conversations to place the received email from the separate folder. Additionally, the user can either combine or separate the conversations according to the suggestions from the email client. This assists the user to classify the received email in a logical manner.

A conversation detection system may be provided as a service to a customer over a network.

Figure 7:
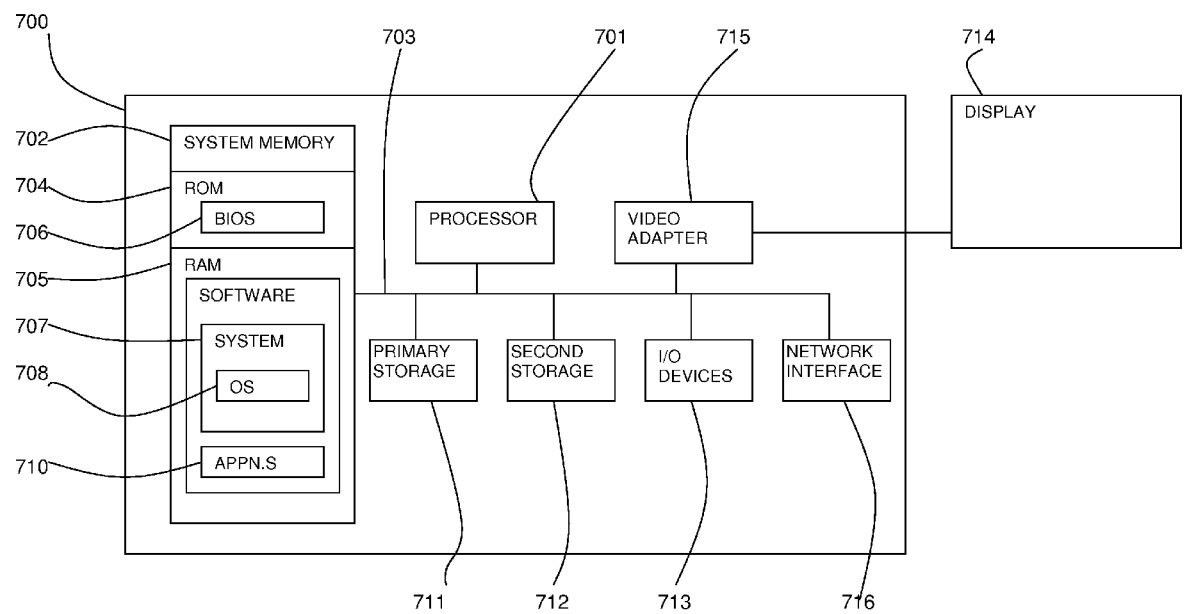
FIG. 7 is a block diagram of a computer system in which the present invention may be implemented.

Referring to FIG. 7, an exemplary system for implementing the invention includes a data processing system 700 suitable for storing and/or executing program code including at least one processor 701 coupled directly or indirectly to memory elements through a bus system 703. The memory elements can include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. System software 707 may be stored in RAM 705 including operating system software 708. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 can be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for conversation detection in email systems, comprising:
   providing a computer system, wherein the system comprises distinct program modules embodied on a computer-readable medium, and wherein the distinct program modules comprise a conversation detector;
   executing the conversation detector to group email messages into first groups, each of the first groups having a common core subject to thereby define a conversation by applying a similarity function a first time based on a similarity of the email messages' attributes, the similarity function including:
   a similarity between the email messages' participants;
   at least one of a similarity between the email messages' subjects and a similarity between the email messages' contents;
   applying the similarity function a second time to group the email messages of the first groups into respective second groups; and
   defining the second groups as sub-conversations.

2. The method as claimed in claim 1, wherein the similarity function also includes a similarity between the email messages' dates.

3. The method as claimed in claim 2, including defining a maximum date difference between email messages, above which the date similarity is zeroed.

4. The method as claimed in claim 1, wherein the similarity function includes weightings for the contributions of the email messages' attributes.

5. The method as claimed in claim 4, wherein the weightings are optimized using machine learning.

6. The method as claimed in claim 1, further including:
   applying the similarity function a third time to group the sub-conversations function into new groups; and
   defining the new groups as new conversations.

7. The method as claimed in claim 6, including sorting the sub-conversations by starting date prior to applying the similarity function a third time.

8. The method as claimed in claim 1, including sorting the email messages by date prior to applying the similarity function a second time.

9. The method as claimed in claim 1, including comparing a new message to conversations that previous messages have been grouped into, detecting an optimal conversation for a new message to be added to.

10. The method as claimed in claim 1, wherein the similarity between the email messages' participants includes distinguishing between active and passive participants by applying an activity weighting to a participant in an email message.

11. A system for conversation detection in email systems, comprising:
    a processor; and
    a memory accessible to the processor storing programs and data objects therein, the objects including a mailbox containing a plurality of email messages each having defined attributes, wherein execution of the programs cause the processor to group the email messages to define a conversation by applying a similarity function a first time based on a similarity of the email messages' attributes, the similarity function including: a similarity between the email messages' participants; and at least one of a similarity between the email messages' subjects and a similarity between the email messages' contents, wherein the processor is operative for:
    grouping the email messages together in subject groups having a same core subject;
    grouping the email messages within the subject groups by applying the similarity function a second time, and defining first resultant groups as sub-conversations; and
    grouping the sub-conversations across all the subject groups by applying the similarity function a third time, and defining second resultant groups as new conversations.

12. The system as claimed in claim 11, wherein the similarity function also includes a similarity between the email messages' dates.

13. The system as claimed in claim 11, means wherein the processor is operative to set weightings for contributions of the email messages' attributes in the similarity function.

14. The system as claimed in claim 11, wherein the processor is operative for comparing a new message to conversations that previous messages have been grouped into, and for detecting an optimal conversation for addition of the new message to thereto.

15. An email client system for conversation detection, comprising:
    a processor; and
    a memory accessible to the processor storing programs and data objects therein, the objects including a mailbox containing a plurality of email messages each having defined attributes
    a display; and
    wherein the programs comprise a conversation detector and a graphical user interface for displaying the email messages, and the processor is operative to execute the conversation detector to detect a conversation among the email messages
    by applying a similarity function a first time based on a similarity of the email messages' attributes, the similarity function including: a similarity between the email messages' participants; and at least one of a similarity between the email messages' subjects and a similarity between the email messages' contents and to present an indication of the conversation on the display using the graphical user interface, wherein the processor is operative for:
    grouping the email messages together in subject groups having a same core subject;
    grouping the email messages within the subject groups by applying the similarity function a second time, and defining first resultant groups as sub-conversations; and
    grouping the sub-conversations across all the subject groups by applying the similarity function a third time, and defining second resultant groups as new conversations.

16. The email client system as claimed in claim 15, wherein the processor is operative for adding the email messages to the conversation and removing the email messages a from the conversation.

17. The email client system as claimed in claim 15, means wherein the processor is operative to select one of a plurality of conversation choices for a new email message to be added, the conversation choices being best similarity matches to the new email message from conversations comprising previous email messages.

18. A computer program product stored on a computer readable storage medium for conversation detection in email systems, comprising computer readable program code for instructing a computer to perform the steps of:
    grouping email messages into a conversation by applying a similarity function a first time based on a similarity of the email messages' attributes, the similarity function including: a similarity between the email messages' participants; and at least one of a similarity between the email messages' subjects and a similarity between the email messages' contents;

grouping the email messages together in subject groups having a same core subject;

grouping the email messages within the subject groups by applying the similarity function a second time, and defining first resultant groups as sub-conversations; and grouping the sub-conversations across all the subject groups by applying the similarity function a third time, and defining second resultant groups as new conversations.

\* \* \* \* \*